(12) United States Patent
Fukanuma

(10) Patent No.: US 11,988,537 B2
(45) Date of Patent: May 21, 2024

(54) POWDER SUPPLY DEVICE

(71) Applicant: Plasma Giken Co., Ltd., Yoriimachi (JP)

(72) Inventor: Hirotaka Fukanuma, Yoriimachi (JP)

(73) Assignee: Plasma Giken Co., Ltd., Yoriimachi (JP)

( * ) Notice: Subject to any disclaimer, the term of this patent is extended or adjusted under 35 U.S.C. 154(b) by 67 days.

(21) Appl. No.: 17/622,491

(22) PCT Filed: Jun. 12, 2020

(86) PCT No.: PCT/JP2020/023214
§ 371 (c)(1),
(2) Date: Dec. 23, 2021

(87) PCT Pub. No.: WO2020/262042
PCT Pub. Date: Dec. 30, 2020

(65) Prior Publication Data
US 2022/0236094 A1 Jul. 28, 2022

(30) Foreign Application Priority Data
Jun. 25, 2019 (JP) .................. 2019-117161

(51) Int. Cl.
*G01F 11/24* (2006.01)
*B65G 53/46* (2006.01)
*C23C 4/134* (2016.01)

(52) U.S. Cl.
CPC .......... *G01F 11/24* (2013.01); *B65G 53/4633* (2013.01); *C23C 4/134* (2016.01)

(58) Field of Classification Search
CPC ..... G01F 11/24; B65G 53/40; B65G 53/4633; B65G 47/80; B65G 65/4836; C23C 4/134
See application file for complete search history.

(56) References Cited

U.S. PATENT DOCUMENTS

| 3,542,252 | A | * | 11/1970 | Miller | G01F 11/24 222/284 |
| 4,227,835 | A | * | 10/1980 | Nussbaum | H05H 1/42 406/52 |
| 4,880,150 | A | * | 11/1989 | Navin | G01F 11/24 222/367 |
| 7,674,076 | B2 | | 3/2010 | Van Steenkiste et al. | |

(Continued)

FOREIGN PATENT DOCUMENTS

| CN | 105073612 A | 11/2015 |
| CN | 106044279 A | 10/2016 |

(Continued)

*Primary Examiner* — J C Jacyna
(74) *Attorney, Agent, or Firm* — The Webb Law Firm

(57) ABSTRACT

A powder supply device that continuously supply a fixed amount of powder, including a powder accommodation container including a powder delivery hole in an circular outer shape bottom plate, and a disk that continuously rotates and conveys the powder by a groove facing the powder delivery hole and provided on circumference, wherein the disk is disposed to be slidably rotatable with respect to the circular outer shape bottom plate in a state in which a part of a region where the groove is located is covered with the circular outer shape bottom plate of the powder accommodation container.

11 Claims, 1 Drawing Sheet

(56) References Cited

U.S. PATENT DOCUMENTS

| | | | | |
|---|---|---|---|---|
| 2007/0295755 A1* | 12/2007 | Kinzie | ................... | G01F 11/24 |
| | | | | 222/242 |
| 2008/0014031 A1 | 1/2008 | Steenkiste et al. | | |
| 2009/0090601 A1* | 4/2009 | Sasaoka | ............. | G01R 31/2893 |
| | | | | 198/803.5 |
| 2014/0263465 A1* | 9/2014 | Renyer | ................. | B65D 88/54 |
| | | | | 222/352 |
| 2018/0022362 A1* | 1/2018 | Krismanic | ......... | B65G 53/4633 |
| | | | | 291/25 |
| 2023/0175877 A1* | 6/2023 | Vine | .................... | G01F 15/001 |
| | | | | 222/368 |

FOREIGN PATENT DOCUMENTS

| | | |
|---|---|---|
| DE | 19500726 C2 | 7/1998 |
| GB | 1378748 A | 12/1974 |
| JP | 437128 U | 3/1992 |
| JP | 6206627 A | 7/1994 |
| JP | 20012244 A | 1/2001 |
| JP | 2006317375 A | 11/2006 |
| JP | 201241106 A | 3/2012 |

\* cited by examiner

POWDER SUPPLY DEVICE

CROSS-REFERENCE TO RELATED APPLICATIONS

This application is the United States national phase of International Application No. PCT/JP2020/023214 filed Jun. 12, 2020, and claims priority to Japanese Patent Application No. 2019-117161 filed Jun. 25, 2019, the disclosures of which are hereby incorporated by reference in their entirety.

BACKGROUND OF THE INVENTION

1. Technical Field

The present disclosure relates to a powder supply device.

2. Technical Considerations

Conventionally, in the case of performing thermal spraying, powder coating or the like, a powder supply device for continuously supplying a fixed amount of powder (powder, powder coating, or the like of metal, ceramics, cermet, or the like) required for the treatment has been used. It is important that the powder supply device used for such a purpose can stably supply powder as a raw material in a fixed amount without pulsation in order to improve treatment quality.

For example, Japanese Laid Open No. 6-206627 discloses a powder supply device provided with a disk that is rotated by drive means such as a motor inside of a casing. The powder supply device fills a peripheral groove provided on a top surface of the disk with powder accommodated in a hopper via a plate-shaped body having a powder distribution hole, and places the powder conveyed by the peripheral groove on air flow to carry out the powder in a fixed amount to the outside of the casing. The powder supply device in this reference has the structure in which the plate-shaped body fits a protrusion in the peripheral groove and fits a guide protrusion in a guide groove provided on a top surface of the disk, and thereby can remarkably prevent wear of the protrusion that has conventionally been a cause of powder supply unevenness.

However, in the powder supply device disclosed in Japanese Laid Open No. 6-206627, the flow path narrows toward the lower part of the hopper and the fluctuation of the powder pressure becomes large, so that agglomeration of the powder tends to occur and phenomena such as a bridge and a funnel flow are likely to occur. Therefore, when the powder is transferred from the hopper to the disk, interruption and pulsation of the powder are likely to occur, and there is a problem that the powder supply accuracy is lowered.

Further, in the powder supply device disclosed in Japanese Laid Open No. 6-206627, interposing the plate-shaped body between the hopper and the disk described above is an indispensable configuration, and the number of components and limitations in design increase correspondingly, which causes complexity and increase in size of the device. In recent years, powder supply devices with simplified and miniaturized configurations have been demanded to improve operability and maintainability.

SUMMARY OF THE INVENTION

From the above, the present disclosure relates to an improved powder supply device that realizes simplification and miniaturization of the device while supplying a fixed amount of powder stably and continuously.

In non-limiting embodiments, provided is a powder supply device that continuously supplies a fixed amount of powder, and includes a powder accommodation container including a powder delivery hole in an circular outer shape bottom plate, and a disk that continuously rotates and conveys the powder by a groove facing the powder delivery hole and provided on circumference, wherein the disk is disposed to be slidably rotatable with respect to the circular outer shape bottom plate in a state where a part of a region where the groove is located is covered with the circular outer shape bottom plate of the powder accommodation container.

Further, in non-limiting embodiments, the powder accommodation container includes a blade member that rotates around a center axis of the powder accommodation container in a vicinity of the circular outer shape bottom plate of an inside of the powder accommodation container, and the powder delivery hole is disposed in a region near a circumferential wall of the powder accommodation container.

Further, in non-limiting embodiments, the groove has a depth of 1.0 mm to 5.0 mm and a width of 5 mm to 30 mm when using powder with a maximum grain size equal to or less than 1 mm.

Further, in in non-limiting embodiments, the powder delivery hole has a long hole shape extending correspondingly to the groove.

Further, in non-limiting embodiments, in the circular outer shape bottom plate, at least a contact portion with the disk is made of a resin.

Further, in non-limiting embodiments, the powder supply device includes a powder carrying-out tube that has a tip end portion disposed in an upper portion of the groove, and places the powder on a carrier gas flow to carry out the powder upward.

By adopting the powder supply device according to the present invention, it is possible to continuously supply a fixed amount of powder stably. Consequently, according to the powder supply device according to the present disclosure, it is possible to perform treatment such as thermal spraying using powder and powder coating with high quality. Further, by adopting the powder supply device according to the present disclosure, it is possible to realize simplification and miniaturization of the device. The powder supply device according to the present disclosure can reduce the number of components more than the conventional device, and therefore can achieve reduction in component cost.

DETAILED DESCRIPTION

Hereinafter, non-limiting embodiments of the present disclosure will be described in detail with reference to the drawings, but the present disclosure is not construed by being limited to these non-limiting embodiments.

Figure 1:
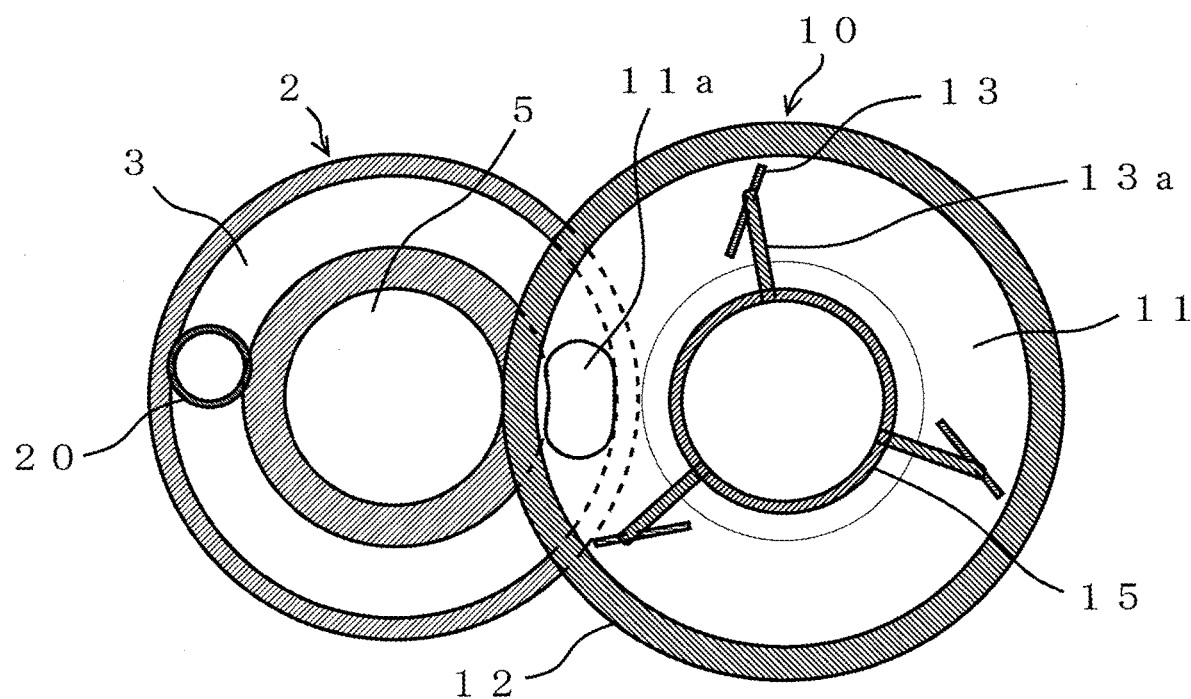
FIG. 1 is a schematic plan view of a portion of a powder supply device according to non-limiting embodiments of the present disclosure.

FIG. 1 shows a schematic plan view of a portion of a powder supply device according to non-limiting embodiments of the present disclosure. A powder supply device 1 is a powder supply device that continuously supplies a fixed amount of powder P, and includes a powder accommodation container 10 having a powder delivery hole 11a in an circular outer shape bottom plate 11, and a disk 2 that continuously rotates and conveys the powder P by a groove provided on a circumference and facing the powder delivery hole 11a, and the disk 2 is disposed to be slidably rotatable with respect to the circular outer shape bottom plate 11 in a state where a part of a region where a groove 3 is located is covered with the circular outer shape bottom plate 11 of the powder accommodation container 10. In non-limiting embodiments, the powder supply device 1 includes the aforementioned powder accommodation container 10 and the disk 2 in a configuration, and thereby can realize simplification and miniaturization of the device while achieving stability of supply of powder. Hereinafter, these "powder accommodation container" and "disk" will be described in order.

In non-limiting embodiments, the powder accommodation container 10 includes the flat-board-shaped circular outer shape bottom plate 11 where the single powder delivery hole 11a can cause the powder P to pass (drop) through, in a bottom portion thereof. By including the circular outer shape bottom plate 11, pressure that is exerted on the powder P in the bottom portion of the powder accommodation container 10 hardly varies, and interruption and pulsation of the powder P hardly occur when the powder P falls from the powder accommodation container 10. Furthermore, even if the powder P has a high angle of repose and poor flowability, which make stable supply difficult in the conventional powder supply device, it becomes possible to cause the powder P to fall from the powder accommodation container 10 without causing interruption and pulsation. Accordingly, it becomes possible to continuously fill the groove 3 of the disk 2 described later without variation.

The powder delivery hole 11a should not be limited to a particular size and a shape thereof, and the size and shape can be set according to a kind (a size, a shape, a material, and the like) of the powder P to be accommodated in the powder accommodation container 10. Further, the powder delivery hole 11a should not be limited to a position where it is formed in the circular outer shape bottom plate 11. However, the powder delivery hole 11a is preferably formed in a position separated from a circumferential wall 12 of the powder accommodation container 10 slightly inward (e.g., 5 mm or more from an outer circumference of the circular outer shape bottom plate 11) in continuously supplying a fixed amount of the powder P stably because the powder P is levelled off to a constant height by the circular outer shape bottom plate 11. From the above, the powder accommodation container 10 has fewer limitations concerning the installation place as compared with the conventional device, and has a high degree of freedom in design.

Further, in non-limiting embodiments, the powder accommodation container 10 incudes a blade member 3 that rotates around a center axis C thereof (see FIG. 2) in a vicinity of the circular outer shape bottom plate 11 inside the powder accommodation container 10, and, in non-limiting embodiments, has the powder delivery hole 11a disposed in a region near the circumferential wall 12 thereof.

In non-limiting embodiments, the powder accommodation container 10 includes and rotates the blade member 13 in the vicinity of the circular outer shape bottom plate 11, whereby the powder P accommodated inside the powder accommodation container 10 is stirred, and a dry state of the powder P is maintained to make it difficult for the powder P to agglomerate. Further, even if the powder P is agglomerated, the agglomerated powder P can be dispersed, and the powder P can be effectively prevented from being fixedly attached onto the circular outer shape bottom plate 11 and the circumferential wall 12. Further, as a result that the blade member 13 rotates in the vicinity of the circular outer shape bottom plate 11, the powder P can be smoothly guided to the powder delivery hole 11a regardless of difference in kind and properties of the powder P. Consequently, it is more effective in transferring a fixed amount of the powder P with a high angle of repose and poor flowability to the groove 3 of the disk 2 described later without unevenness.

While the number of blade members 13 used should not be limited, in non-limiting embodiments, a plurality of blade members 13 are disposed at equal spaces in a circumferential direction in always guiding a stable amount of the powder P to the powder delivery hole 11a. Further, the blade member 13 should not be limited in its shape, and the shape of the blade member 13 can be set in consideration of the kind and the properties of the powder P. In non-limiting embodiments, the blade member 13 is included at least in one stage in the vicinity of the circular outer shape bottom plate 11, and can be installed in a plurality of stages in a height direction.

In non-limiting embodiments, the powder accommodation container 10 may have a configuration that regularly vibrates the powder accommodation container 10 by using, for example, a vibration mechanism to prevent agglomeration of the powder P besides using the aforementioned blade member 13, in order to stably supply the powder P. Further, a sensor (not illustrated) that detects an amount of the powder P may be provided on the inner wall of the powder accommodation container 10, and control may be performed so as to feed the powder P automatically when the amount of the powder P in the powder accommodation container 10 becomes smaller than a predetermined amount. In doing so, it is possible to always keep the pressure exerted on the powder P on the bottom portion of the powder accommodation container 10 constant, and it is possible to improve treatment quality when performing treatment, such as thermal spraying and coating. Further, even when performing treatment using a large amount of the powder P, operation does not have to be intermitted, and it is possible to shorten a treatment time period to enhance productivity.

Further, in non-limiting embodiments, the powder delivery hole 11a has a long hole shape extending in a position corresponding (facing) to the groove 3 of the disk 2 described later. The powder delivery hole 11a formed in the circular outer shape bottom plate 11 may be formed into a long hole shape extending along the groove 3 of the disk 2 rather than simply formed into a circular shape, when an opening area is constant, whereby transfer of the powder to the groove 3 of the disk 2 from the powder supply device 1 can be smoothly performed, and unevenness of the amount of the powder P that is transferred to the groove 3 can be decreased.

Further, in non-limiting embodiments, at least a contact portion of the circular outer shape bottom plate 11 with the disk 2 is made of a resin. The disk 2 rotates in a state contacting the circular outer shape bottom plate 11, so that when these members are made of metal, for example, galling (adhesion) is likely to occur between these members, and there is a risk that durability will be reduced due to wear. However, as a result that at least the contact portion of the circular outer shape bottom plate 11 with the disk 2 is made of a resin, such a problem can be effectively suppressed from occurring. Further, as a result that at least only the contact portion is made of a resin, exchange in a case of the contact portion being worn can be easily performed, and improvement in maintainability can also be achieved.

In non-limiting embodiments, the disk 2 has the recessed groove 3 formed on a circumference at a predetermined position from a center thereof and can convey the powder P to a predetermined position with the groove 3 by rotating. The disk 2 is installed so that any spot of the groove 3 always comes directly under the aforementioned powder delivery hole 11a (communicates with the powder delivery hole 11a) during rotation.

In non-limiting embodiments, a sectional shape of the groove 3 is not limited, and the section shape can be properly adopted from a rectangle, a semicircle, a V-shape, a U-shape, and the like. Further, a depth, a width, and a length of the groove can be properly set in consideration of a size of the powder P, and an intended supply amount of the powder P. In controlling (adjusting) the supply amount of the powder P, a sectional area of the groove 3 may be desirably constant in a circumferential direction. Further, the disk 2 is driven with a rotary shaft by drive means, such as a motor. Since the powder P supply amount is proportional to the rotational speed of the disk 2, it is possible to properly adjust the supply amount of the powder P by increasing or decreasing the rotational speed of the motor.

Further, in non-limiting embodiments, the groove 3 has a depth of 1.0 mm to 5.0 mm and a width of 5 mm to 30 mm, when the powder P with a maximum grain size equal to or less than 1 mm is used. A bridge phenomenon easily occurs in the vicinity of the bottom portion of the powder accommodation container 10 when the powder P with a maximum grain size equal to or less than 1 mm is used. In non-limiting embodiments, the powder supply device 1 can fill the powder P in the groove 3 stably by making the depth of the groove 3, 1.0 mm to 5.0 mm, and making the width of the groove 3, 5 mm to 30 mm, even if the powder P with the maximum grain size equal to or less than 1 mm is used. In non-limiting embodiments, when the depth of the groove 3 becomes less than 1.0 mm or the width of the groove 3 becomes less than 5 mm, a reduction in conveyance amount of the powder P is caused, and utility of the powder supply device 11 is reduced. Note that a lower limit of the maximum grain size of the powder P is not limited. However, in order to secure a stable conveyance amount by using an inert gas carrier, and in non-limiting embodiments, approximately 10 µm may be a lower limit of the maximum grain size.

Further, in non-limiting embodiments, the powder supply device 1 includes a powder carrying-out tube 20 (see FIG. 2) that has a tip end portion disposed on an upper portion of the groove 3 and places the powder P on a carrier gas flow to carry out the powder P upward.

The powder supply device 1 can stably supply a fixed amount of the powder P while preventing increase in equipment cost by being configured to carry out a fixed amount of the powder P from a pressurized space toward upwards by carrier gas. For example, when the disk 2 is installed in a container that is hermetically closed, carrier gas is introduced into the container, the carrier gas is discharged at a high speed via the powder carrying-out tube 20 by a pressure difference from external air pressure that occurs at this time, and the powder P located near a tip end of the powder carrying-out tube 20 in the groove 3 is carried out to the outside by a fixed amount by accompanying the carrier gas. Further, the carrier gas is also effective in suppressing the powder P from staying in the groove 3 by static electricity or the like.

The aforementioned carrier gas is not limited concerning the kind of gas, and can be any gas that can be accompanied by the powder P. As the carrier gas, for example, air gas, argon gas, helium gas, or the like can be used.

With respect to the non-limiting embodiments of the powder supply device described above, and in non-limiting embodiments a series of operations of the powder supply device are described hereinafter. In the following, an effect of the powder supply device 1 according to the present disclosure will be described assuming a non-limiting case where a fixed amount of powder, such as "ceramics", is supplied to a thermal spray gun to perform plasma spraying, for example.

Figure 2:
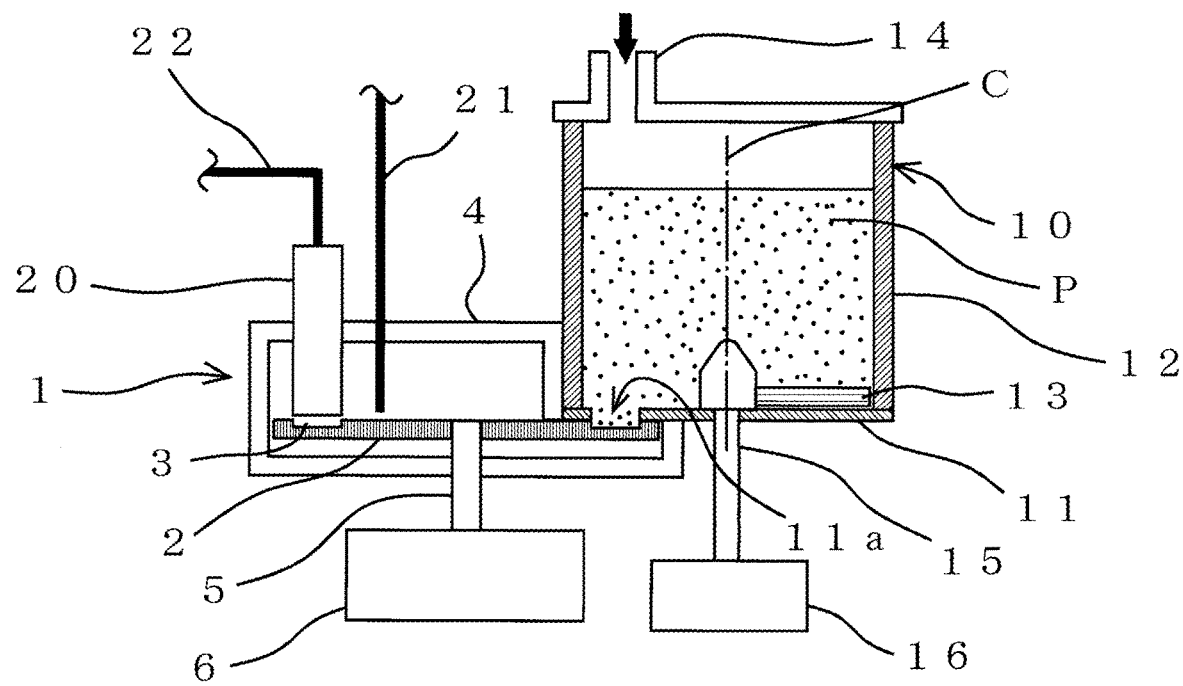
FIG. 2 is a schematic vertical sectional view illustrating an operation of the powder supply device according to non-limiting embodiments of the present disclosure.

FIG. 2 shows a schematic vertical sectional view for explaining an operation of the powder supply device according to non-limiting embodiments of the present invention. First, the powder P is accommodated in the powder accommodation container 10 via a powder input hole 14. In the powder accommodation container 10, the blade member 13 is disposed in the vicinity of the circular outer shape bottom plate 11. The blade member 13 rotates around a rotary shaft 15 on a center axis C of the powder accommodation container 10 by a motor 16, whereby the blade member 13 stirs the powder P in the powder accommodation container 10 to crush a locally agglomerated mass portion, and guides the powder P to the powder delivery hole 11a. Note that when using the blade member 13, it is possible to guide the powder P to the powder delivery hole 11a more efficiently and stably by placing the powder delivery hole 11a near the circumferential wall 12.

The disk 2 rotates around a rotary shaft 5 by a motor 6. The disk 2 is installed so that any spot of the groove 3 always comes directly under the powder delivery hole 11a during rotation. Further, the disk 2 is installed in a state slidable with respect to the circular outer shape bottom plate 11. By installing the disk 2 at such a position, the powder P is continuously supplied into the groove 3 via the powder delivery hole 11a of the circular outer shape bottom plate 11 of the powder accommodation container 10.

The disk 2 slides with respect to the circular outer shape bottom plate 11, whereby the circular outer shape bottom plate 11 plays a part of a squeegee, and the powder P filled in the groove 3 of the disk 2 is continuously conveyed toward a lower position of the powder carrying-out tube 20 in a state where the powder P is levelled off at an upper end portion (substantially same position as a top surface of the disk 2) of the groove 3. Further, sectional areas of the groove 3 are all set to have a same size in the circumferential direction. Accordingly, when a rotational speed of the disk 2 is constant, the amount of the powder P that is supplied by the powder supply device 1 becomes always constant.

Further, the disk 2 is installed in a hermetically sealed container 4. Carrier gas (argon gas or the like) is blown into the hermetically sealed container 4 from a gas supply line 21, and an inside is brought into a high-pressure state, whereby the powder P conveyed to near the tip end of the powder carrying-out tube 20 is drawn by argon gas, and is fed to a plasma spray device (not illustrated) via a conveyance gas line 22. After supplying a fixed amount of the powder P to the plasma spray device, the powder supply device 1 stops drive of the motor 16 for driving the blade member 13 and drive of the motor 6 for driving the disk 2, and ends a powder supply operation.

In non-limiting embodiments, the powder supply device 1 according to the present disclosure realizes high accuracy of powder supply by including the disk 2 and the circular outer shape bottom plate 11 in the configuration and disposing the disk 2 and the circular outer shape bottom plate 11 in the state in contact with each other. Further, the powder supply device 1 according to the present disclosure realizes the configuration in which the number of components is made smaller than the conventional device to reduce the component cost, and is excellent in ease of assembly and maintainability. Further, it is possible to dispose both the motor 16 for driving the blade member 13 and the motor 6 for driving the disk 2 below the powder supply device 1, and it is possible to enhance a degree of freedom in installation place.

According to the powder supply device according to the present disclosure, the powder supply device can realize simplification and miniaturization of the device while enabling supply of a fixed amount of each of various kinds of powder, and therefore can be favorably used in various fields. For example, in addition to the aforementioned plasma spraying, the powder supply device according to the present invention can also be favorably used when flour or the like is supplied to produce groceries, and when a projection material is supplied to perform surface processing of a matter.

The invention claimed is:

1. A powder supply device that continuously supplies a fixed amount of powder, comprising:
    a powder accommodation container including a powder delivery hole in aft circular outer shape bottom plate;
    a disk installed in a hermetically sealed container that continuously rotates and conveys the powder by a groove facing the powder delivery hole and provided on a circumference;
    a gas supply line that blows a carrier gas into the hermetically sealed container; and
    a powder carrying-out tube,
    wherein the disk is disposed to be slidably rotatable with respect to the circular outer shape bottom plate in a state where a part of a region where the groove is located is covered with the circular outer shape bottom plate of the powder accommodation container, and
    wherein the powder carrying-out tube has a tip end portion disposed in an upper portion of the groove, and places the powder that was rotated and conveyed and is located near the tip end portion of the powder carrying-out tube from a pressurized space in the hermetically sealed container on a carrier gas flow to carry out the powder upward.

2. The powder supply device according to claim 1, wherein the powder accommodation container includes a blade member that rotates around a center axis of the powder accommodation container in a vicinity of the circular outer shape bottom plate of an inside of the powder accommodation container, and the powder delivery hole is placed in a region near a circumferential wall of the powder accommodation container.

3. The powder supply device according to claim 1, wherein the groove has a depth of 1.0 mm to 5.0 mm and a width of 5 mm to 30 mm when using powder with a maximum grain size equal to or less than 1 mm.

4. The powder supply device according to claim 1, wherein the powder delivery hole has a long hole shape extending correspondingly to the groove.

5. The powder supply device according to claim 1, wherein in the circular outer shape bottom plate, at least a contact portion with the disk is made of a resin.

6. The powder supply device according to claim 2, wherein the groove has a depth of 1.0 mm to 5.0 mm and a width of 5 mm to 30 mm when using powder with a maximum grain size equal to or less than 1 mm.

7. The powder supply device according to claim 2, wherein the powder delivery hole has a long hole shape extending correspondingly to the groove.

8. The powder supply device according to claim 3, wherein the powder delivery hole has a long hole shape extending correspondingly to the groove.

9. The powder supply device according to claim 2, wherein in the circular outer shape bottom plate, at least a contact portion with the disk is made of a resin.

10. The powder supply device according to claim 3, wherein in the circular outer shape bottom plate, at least a contact portion with the disk is made of a resin.

11. The powder supply device according to claim 4, wherein in the circular outer shape bottom plate, at least a contact portion with the disk is made of a resin.

* * * * *